(12) United States Patent
Linn

(10) Patent No.: US 8,046,263 B1
(45) Date of Patent: Oct. 25, 2011

(54) METHOD OF OFFERING HOME INSPECTION SERVICES THROUGH RETAILERS

(75) Inventor: Andrew S. Linn, Alpharetta, GA (US)

(73) Assignee: Inside-Out Home Care LLC, Alpharetta, GA (US)

( * ) Notice: Subject to any disclaimer, the term of this patent is extended or adjusted under 35 U.S.C. 154(b) by 1337 days.

(21) Appl. No.: 11/470,912

(22) Filed: Sep. 7, 2006

Related U.S. Application Data

(60) Provisional application No. 60/714,611, filed on Sep. 7, 2005.

(51) Int. Cl.
 *G06Q 30/00* (2006.01)
(52) U.S. Cl. .................................................. 705/26.1
(58) Field of Classification Search .......... 705/26, 705/27, 26.1
 See application file for complete search history.

(56) References Cited

U.S. PATENT DOCUMENTS

| | | | |
|---|---|---|---|
| 5,724,261 A | 3/1998 | Denny et al. | |
| 2003/0212565 A1* | 11/2003 | Badali et al. | 705/1 |
| 2005/0131596 A1* | 6/2005 | Cherrington et al. | 701/29 |
| 2005/0177491 A1* | 8/2005 | Siverson et al. | 705/38 |
| 2005/0289017 A1* | 12/2005 | Gershom | 705/26 |
| 2006/0080132 A1* | 4/2006 | Hall et al. | 705/1 |
| 2008/0071639 A1* | 3/2008 | Jacobs et al. | 705/26 |

OTHER PUBLICATIONS

Michelle Slatalla, New York Times. (Late Edition (East Coast)). New York, N.Y.: Nov. 13, 2003. p. G.4 http://proquest.umi.com/pqdweb?did=444804691&sid=4&Fmt=3&clientId=19649&RQT=309&VName=PQD.*
Lowe's Installation Services,webpages: htpp://www/lowes.com/lowes/lkn?action=pg&p=InstServ/ctg_all.html&rrn=RightNavFiles/no.html, Aug. 30, 2006, 1-2.
Home Depot Installation Services, webpage: http://www.homedepot.com/pre180/HDUS/EN_US/services/athomeservices/pg_index.jsp?CNTT..., Aug. 30, 2006, 1.
Energy Federation Incorporated, "EFI Consumer Division Residential Catalogue Kidde Radon Detector Kit", webpages:http://www/energyfederation.org/cosumer/default.php/cPath/398_1266, 1-2.

* cited by examiner

*Primary Examiner* — Mila Airapetian
(74) *Attorney, Agent, or Firm* — Standley Law Group LLP

(57) ABSTRACT

Methods of offering inspection services through retailers are described. Customers may obtain access to qualified home inspectors in a sub-contractor referral service area of a retailer through the use of a kiosk, service desk or similar point-of-purchase display. The retailer may partner with the inspector or inspection company for a fee. The retailer may offer Inspection Services Gift Cards for sale to customers. The retailer may also receive additional business from the inspection company's customers who may return to the retailer to purchase replacement items for those found deficient from the inspection.

9 Claims, 7 Drawing Sheets

MARKETING PATH USED BY PROPERTY INSPECTORS TO FIND CLIENTS

ILLUSTRATIONS OF THE CALL CENTER
1. Call Center Building
2. Call Center Sales Person
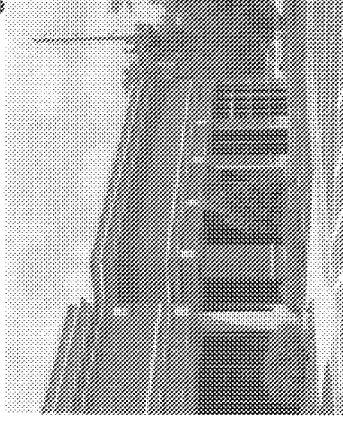
3. Sample Work Order
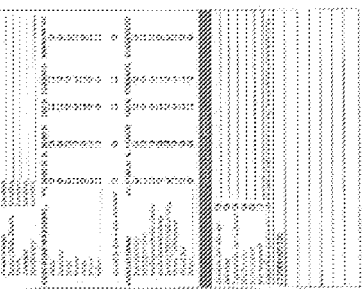
4. Sample Inspection Report
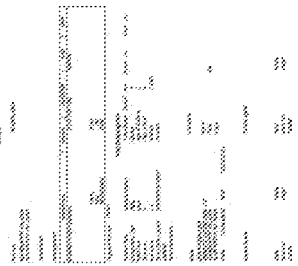
Made available to the client in either a paper report Or as an electronic email in .pdf file format.
FIG. 7

METHOD OF OFFERING HOME INSPECTION SERVICES THROUGH RETAILERS

BACKGROUND AND SUMMARY OF THE INVENTION

The present invention relates to methods for offering home and commercial building inspection services. More specifically, exemplary embodiments of the present invention may be directed to method for offering inspection services through retailers that offer home improvement, home furnishing and office supply products and services.

Exemplary methods may involve having access to qualified home inspectors in a sub-contractor referral service area of the retailer's store through the use of a kiosk or similar point-of-purchase display. The retailer may partner with the inspector or inspection company for a fee. The retailer may also receive additional business from the inspection company's customers who may return to the retailer to purchase replacement items for those found deficient from the inspection.

A home or commercial building inspection is an objective examination of the condition of the visible and accessible components of a home or building. Owners, buyers and sellers view these inspections as a way to gain valuable information about their property because most often this property represents their single greatest investment. It helps them to determine whether there are any major defects or system inadequacies before they buy, sell or inhabit the property, and it minimizes any unpleasant surprises, significant financial and/or health related burdens.

Inspectors do not point out every small problem or defect in a home. Minor or cosmetic flaws, for example, should be apparent without the aid of a professional. The inspector's observations or recommendations may help to dispel property owner and buyer anxieties and provide useful home repair and maintenance suggestions. The inspector's service is primarily one of education. The goal of the inspector is to provide property owners, buyers and sellers with a better understanding of the physical condition of their prospective home or business; giving them peace of mind and helping them make more informed decisions about buying and maintaining real estate property.

The following terms as used herein are defined as follows:

Property Inspection: A visual inspection of either residential real estate, which adheres to the American Society of Home Inspector standards or commercial real estate, which adheres to the guidelines set forth by the ASTM (American Society for Testing and Materials).

Inspection Services: Residential inspections (ASHI Standards), commercial inspections (ASTM Standards), airborne radon testing (EPA Protocol) and airborne and surface mold sampling (by an accredited testing laboratory).

Inspection Services Gift Card: Separate cards for each type of inspection in various denominations. These cards may be owned by the inspection company and placed into the retailer's establishment on a consignment basis. The card may then be sold at face value to the public as over-the-counter merchandise. The retailer may retain a percentage on these sales and pass the remaining balance of the sale to the inspection company. The consumer may redeem the cards to the inspection company to render Inspection Services.

Retailer Gift Card: Is the property of the retailer and is sold to whomever for the face value of the card. The inspection company, for example, could buy a Retailer Gift Card in order to provide that retailer credit for a sale. The inspection company may then offer the Retailer Gift Card to their client at no charge as an incentive or token of appreciation. More often than not, the client will return to the retailer to use the card and may also buy merchandise which costs more than the face value of the card.

There are correlations between the inspection industry and the construction industry and the home improvement and retail industry. Inspection service clients may have three concerns: 1) How much are replacement equipment costs? 2) Where is such equipment/materials found? 3) Who can install such equipment/materials?

Nationwide promotions have appeared at home improvement retailers stating that they will install various categories of product purchased from their stores. Specifically, HOME DEPOT rolled out a program named "At Home Services" which is their department designated to find and match a preferred contractor with a client to install a given classification of product. For example, matching a customer looking for flooring with a flooring installation contractor, appliances with an appliance installer, etc. LOWE'S also has a similar service which they call "Installed Services" which also matches a preferred installation contractor with a store customer to install their newly purchased products.

In both of the previous examples, the preferred installers are pre-screened, pre-approved sub-contractors hired by the retailers to install certain products on a contractual basis. In turn, the retailers keep a percentage of the sale as a referral fee. The contractor warranties the work which the retailer then passes onto the customer. The retailers each list over 40 different categories of products which they install. They include electrical, plumbing, roofing, flooring, appliances, paint, wall coverings, play equipment, landscaping and much more. Yet, neither retailer offers Inspection Services to their customers. Other leading retailers such as WAL-MART, TARGET, KROGER, PUBLIX, COSTCO, SAM'S CLUB and STAPLES also do not offer Inspection Services for their residential and small business customers.

The correlation between Inspection Services and retailers may also exist for reasons other than that of finding replacement equipment or installation contractors. For example, when a new property owner is taking possession of a new or existing property, new items may typically be purchased. Once the physical move is complete, new furniture, TV's, stereos and bedding may be purchased. Old items such as barbeque grills, patio furniture, and the like may be discarded and new products purchased.

This trend is in keeping with the American Dream and in keeping with one's desire to stay new and current. Such desire for 'newness' is evidenced by the popularity of HGTV and shows such as Extreme Make-Over Home Edition. Additionally, the public is buying new homes and commercial businesses in record numbers due to low mortgage rates. With the purchase of a new home or business comes the need to have it inspected and buy new items to fill it.

Once the property is inspected, a summary list of defective equipment and materials may be compiled by the inspector and presented to the client. The client (be it the seller or buyer) may shop for new or replacement items. Shopping is what unites the inspection company to the retailer. A mutual client of both entities may buy new or replacement equipment, and/or have other new items installed. Because of this correlation between the inspection company and retailers, both entities can help the other in the promotion of each other's respective companies and in the generation of revenue.

Currently, both inspectors and clients experience problems in finding each other for mutual benefit. Inspectors must work toward being placed on a referral list by a real estate professional. Many real estate professionals require certain credentials before placing an inspector on a referral list. Most referral lists contain multiple inspector names & companies based more on the real estate professional's personal preferences than on the inspector's credentials. Clients are more likely to be biased toward the real estate professional's personal biases of those on such a list. Most Professional Lists, Trade Directories and Internet Directories cost money. Financial resources of the independent inspector are burdened by these costs and the costs of other business related expenses. Not all real estate professionals work full time nor are they writing contracts on a daily basis or even on a weekly basis. Hence, an inspector must rely on a greater pool of agents to obtain referrals, and logistics and little cash flow make it difficult to conduct broad and far reaching marketing solicitation. FIG. 1 shows ways that inspectors have found clients.

Clients experience problems in finding inspectors. First, not all clients work with a real estate professional, and therefore do not have access to the referral lists. Not all clients consider having an inspection performed or are unaware of Inspection Services. Not all clients are internet savvy enough to find an inspector nor are they knowledgeable enough about the Inspection Service to know where to look for an inspector or what questions to ask. A client may be new to the community and not know who to ask or what inspector to call. Many real estate contracts are written in such a way as to provide a very short time frame in which to have an inspection performed which leaves little time to find an inspector. Clients may be too consumed with work, family, careers and the moving process to allow time to find a quality inspector, and many clients buying newly constructed homes do not believe that a new home needs to be inspected since it is 'new'. Posting an in-store display & message for the buying public can help dispel this falsehood. FIG. 2 shows ways that clients have found inspectors. Exemplary embodiments of the present invention may be directed to methods and systems for offering inspection services to a customer of a retailer. In one exemplary embodiment, an order may be placed directly with a retailer for an inspection of a property and an inspector may inspect the property. In another exemplary embodiment, a telephone or a computer, which may be electronically connected to the Internet, may be provided at a kiosk at the retailer. The computer may display a web page. The customer may enter information about themselves and the property to be inspected or simply talk to the inspection company's customer service representative. The customer may then place an order for an inspection of the property and schedule the inspection of the property. The inspector or inspection company may then obtain payment information from the customer and inspect the property on the scheduled date. In another exemplary embodiment, the customer may purchase an Inspection Services Gift Card from a point of sale display at the retailer.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 7 describes the call center process.

DETAILED DESCRIPTION OF THE EXEMPLARY EMBODIMENT(S)

Exemplary embodiments of the present invention may be achieved through a partnership between an inspection company (as a sub-contractor and/or agent for the newly created Inspection Services category) and retailers. Customers may order an Inspection Service either directly through the retailer (at store level or company web site), by purchasing an Inspection Services Gift Card from the retailer, or directly with the inspection company via electronic telecommunication. Examples of such electronic telecommunication ordering accessibility include, but are not limited to, the placement of an in-store kiosk which will provide for a mutually agreeable device (between the inspection company and the retailer) be it a direct dial telephone, fax, or Internet based computer terminal, service desk and/or other point-of-purchase displays.

To enhance the value of such a partnership, and the correlation between retailers and inspection services; the inspection company may make pre-paid Inspection Services Gift Cards in various dominations available which can be sold as an over-the-counter product by the retailer for profit. The consumer may contact the inspection company directly to redeem the card. Any differences in the card value and services rendered can be settled by cash, check or charge card.

Such cards and Inspections Services may be marketed to new and existing homeowners and to commercial businesses who shop with the retailers. For example, a business shopping for office supplies at an office supply store can also have access to an Inspection Services Gift Card for an inspection of a residential or commercial property.

Lastly, the inspection company may agree to buy the Retailer Gift Card as a form of compensation to the retailer for the inspection referral. The inspection company may then present the Retailer Gift Card to the client as a token of appreciation. The retailer may benefit further by having the client return to their store to redeem the card and to make additional purchases.

Figure 1:
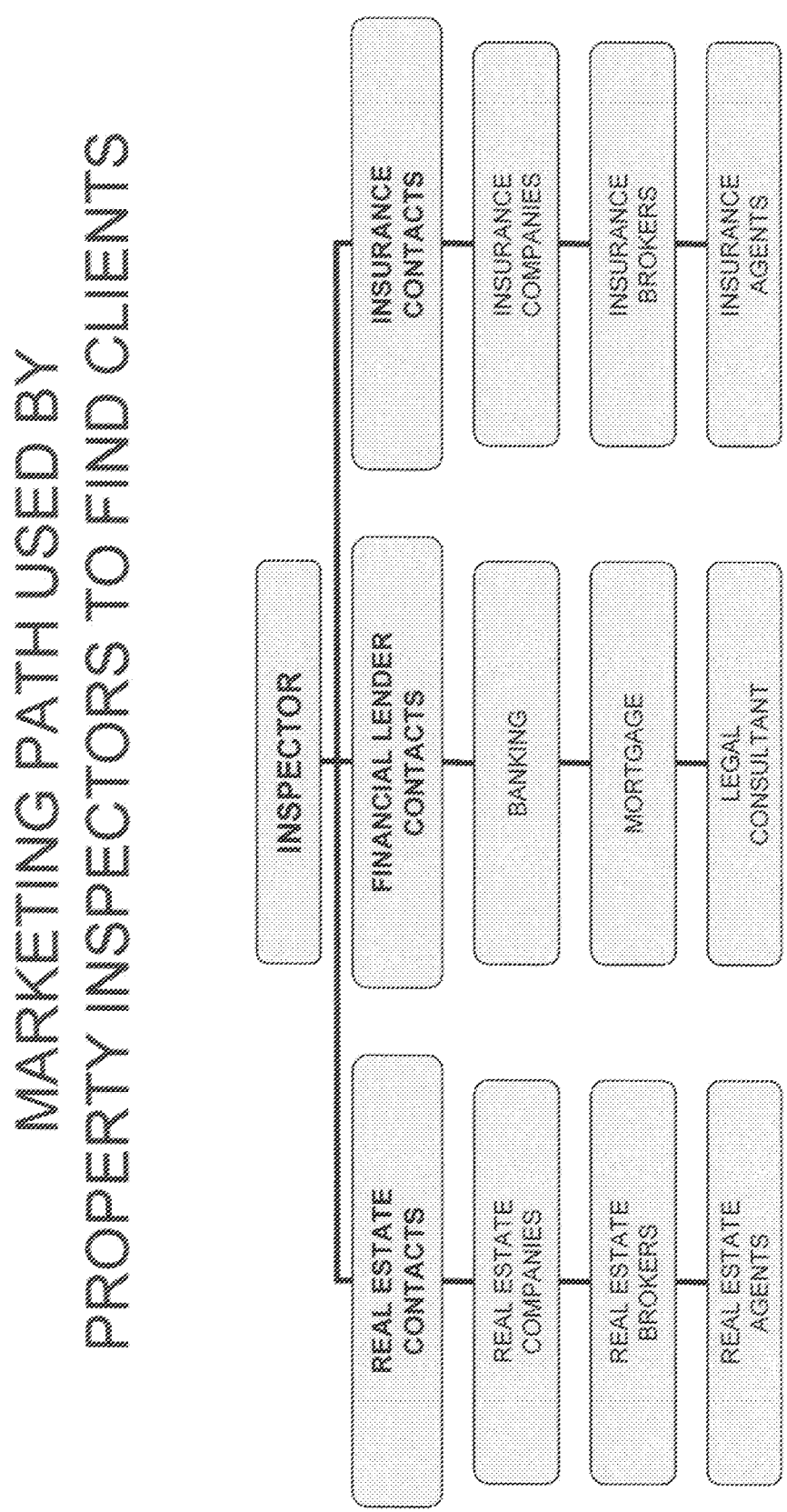
FIG. 1 shows ways home inspectors have found clients.
Figure 2:
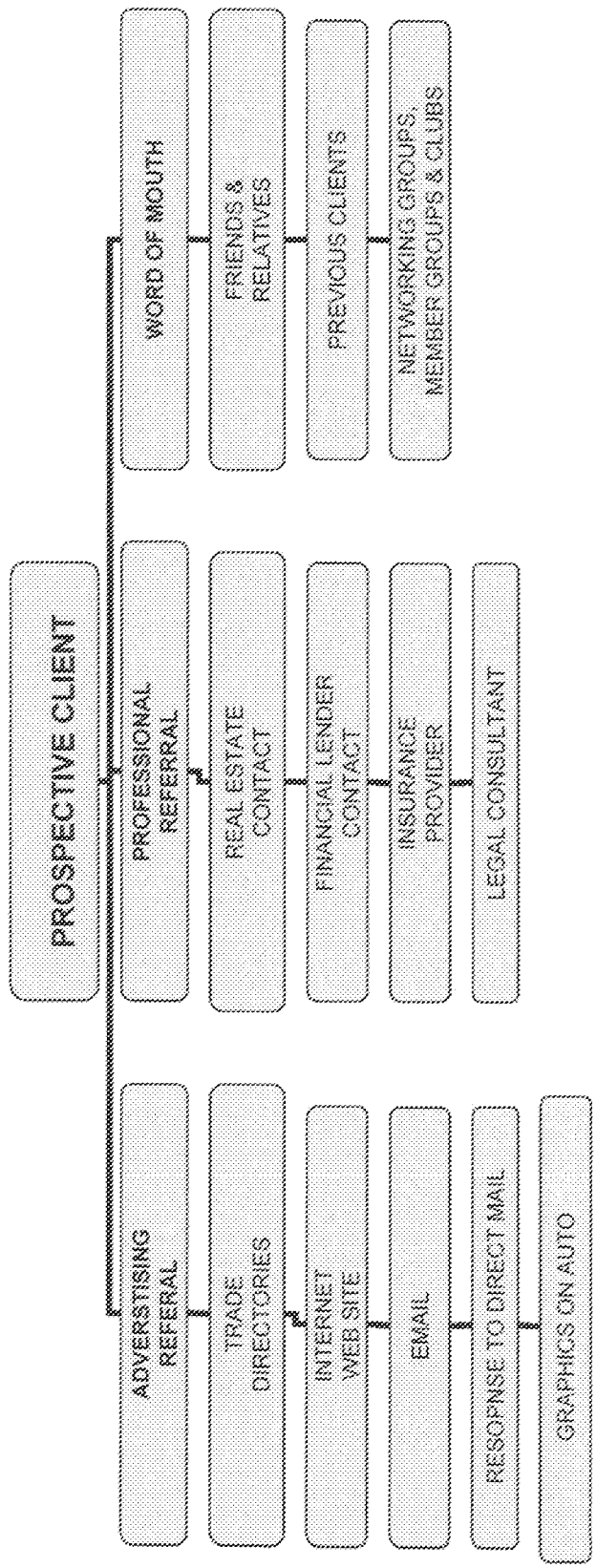
FIG. 2 shows ways clients have found home inspectors.
Figure 3:
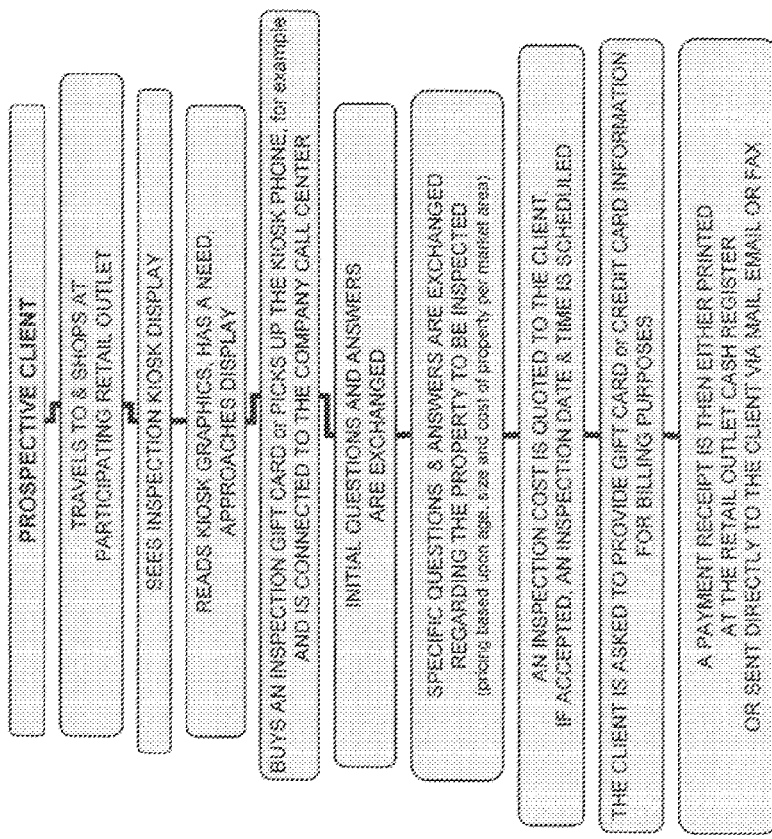
FIG. 3 describes an example of how the inspection ordering process may work.
Figure 4:
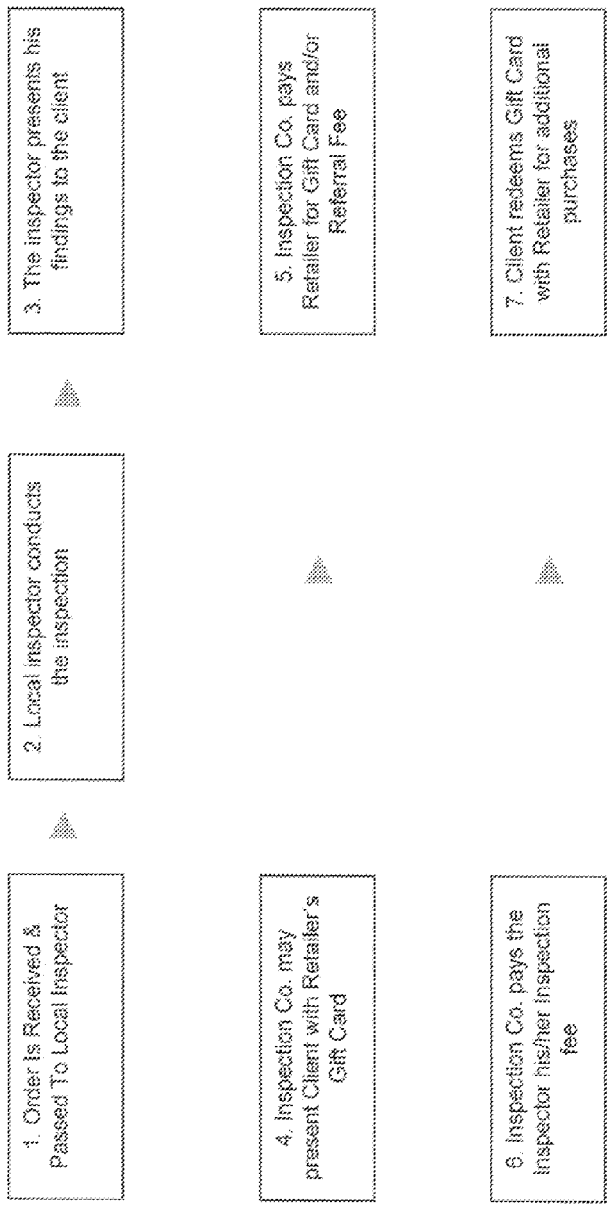
FIG. 4 describes how an inspection order may be processed.
Figure 5:
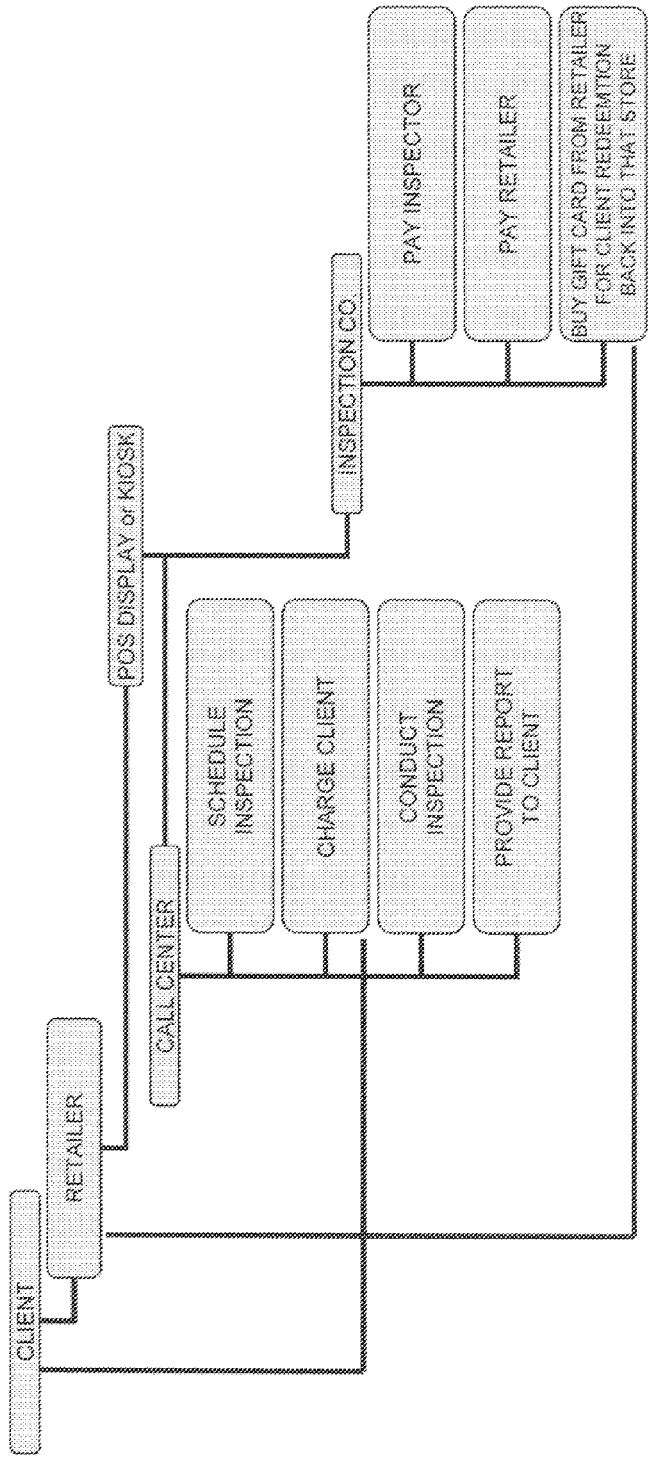
FIG. 5 provides further detail on the full transaction.
Figure 6:
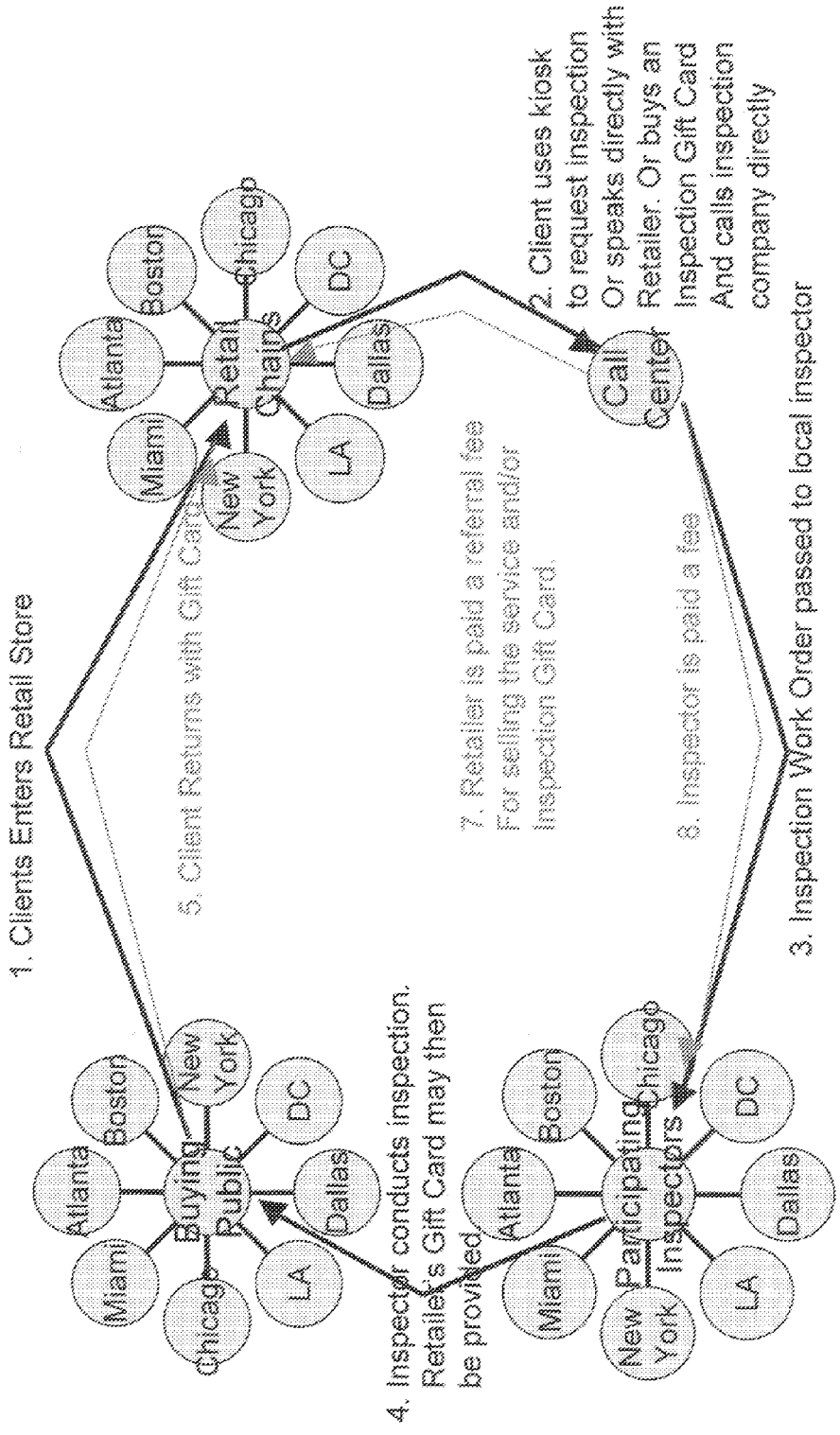
FIG. 6 provides further detail on how the inspection process may be available across the country.

An example of how the inspection ordering process works is shown in FIG. 3. The prospective client may shop at a retailer and see the in-store kiosk display, point of purchase display or service desk. The client may visit the kiosk and pick up a telephone, sit at a computer, buy an Inspection Services Gift Card or speak directly with an in-store representative. The client may then be connected to or may call the company call center or website. The client may ask questions and receives answers. The client gives information about the property to be inspected. An inspection cost is quoted to the client, if it is acceptable to the client an inspection date and time are scheduled. The client may pay for the service and a receipt may be given to the client. FIG. 4 illustrates the inspection process. First, the order may be received and given to a local inspector. The inspector inspects the property at the scheduled date and time. The inspector may give the inspection results to the client and may present the client with the referring retailer's Retailer Gift Card. Next, the inspection company may pay the Retailer for the Retailer Gift Card and/or referral fee and may pay the individual inspector his/her inspection fee for conducting the inspection. The client may redeem the Retailer Gift Card with the retailer for additional purchases. FIGS. 5-7 shows additional details of the process.

A number of methods have just been outlined. For example, forming a partnership with retailers in a newly formed Inspection Services category. This category may market Property Inspections (for both residential and commercial properties) to their customers. This function is a continuation of the retailer's efforts in providing needed home improvement and installation services to both new and existing homeowners and commercial businesses. This mechanism further compliments these retailer's service commitments with programs such as, free delivery, decorating & installation service to in store banking and small business support programs.

The partnership may be made accessible to the public through a number of mutually agreeable interfaces which includes, but is not limited to, face to face with a store clerk, a point of purchase display having Inspection Services Gift Cards, a retailer's web site, direct dial telephone to the inspection company's call center and/or an in-store kiosk which will provide for one or all of the following: direct dial telephone to the inspection company call center, a fax, and/or an internet based computer terminal. This allows the inspector referral mechanism to be directly in front of the prospective client where they are most likely to be found shopping for their home improvement, home appliance and small business needs.

Over-the-counter Inspection Services Gift Cards may be offered for sale at leading retailers, internet web sites and shopping mall merchandise carts & kiosks. This also makes it a "gift" available for purchase for a friend or loved one who is either buying real estate or for one who has health concerns and seeks additional inspection services for such concerns as mold & radon gas.

The Retailer Gift Card may be bought as a form of compensation to the retailer for the inspection referral with the added benefit to the retailer of having the likely chance that the client will return to the store to redeem the card and to make additional purchases.

Advantages of the present invention include: partnership with major retail chains, utilizing interactive in-store display kiosks and Inspection Service Gift Cards, connecting the buying public with an unbiased property inspector, thus, eliminating conflict of interest concerns with inspector referrals from real estate professionals and ability to gain access to the inspection company's Inspection Services and to be unhindered in the process.

While certain embodiments of the present invention are described in detail above, the scope of the invention is not to be considered limited by such disclosure, and modifications are possible without departing from the spirit of the invention.

What is claimed is:

1. A method for offering inspection services to a customer of a home improvement retailer, comprising:
    providing a first database of home inspectors;
    providing a computer as a part of a kiosk at said home improvement retailer, adapted to access said first database;
    acquiring customer information relating to personal information into a second database;
    acquiring property information including needed services relating to a property to be inspected into said second database;
    said computer matching said services needed with said list of home inspectors to output identification of at least one home inspector who provides said services needed;
    said computer compiling costs of matched services for said customer; and
    said computer transmitting a quote of the matched services and identification of at least one matched home inspector to said customer at the kiosk.

2. The method of claim 1 further comprising:
    said computer being electronically connected to the Internet; and
    providing a web page wherein said customer and property information is entered.

3. The method of claim 2 wherein said kiosk is adapted to schedule said inspection of said property.

4. The method of claim 1 further comprising:
    obtaining payment information of said customer through said kiosk;
    connecting and transmitting payment information with a payment provider;
    generating a payment receipt for said customer; and
    providing the results of said inspection to said customer.

5. The method of claim 4 further comprising:
    providing a Retailer Gift Card to said customer through said kiosk which is adapted to transmit said card to said customer.

6. A method for offering inspection services to a customer of a home improvement retailer, comprising:
    providing a first database of home inspectors;
    providing a computer at a kiosk at said home improvement retailer, said computer being electronically connected to the Internet;
    providing a web page;
    acquiring customer information into a second database;
    acquiring property information including needed services relating to a property to be inspected into said second database;
    said computer matching said services needed with said list of home inspectors to output identification of at least one home inspector who provides said services needed;
    said computer compiling costs of matched services for customer;
    said computer transmitting a quote of the matched services to the customer;
    said kiosk is adapted to schedule said inspection of said property;
    obtaining payment information from said customer;
    connecting and transmitting payment information with a payment provider; and
    generating a payment receipt for customer.

7. The method of claim 6, further comprising:
    providing the home inspector with a list of services required.

8. The method of claim 1, further comprising:
    providing said identified at least on home inspector with a list of services required.

9. The method of claim 7, further comprising:
    providing a Retailer Gift Card to said customer through said kiosk which is adapted to transmit said card to said customer.

* * * * *